United States Patent
Son (10) Patent No.: US 9,835,226 B2
(45) Date of Patent: Dec. 5, 2017

(54) TORSIONAL DAMPER WITH INDEPENDENTLY ROTATING INERTIA MASSES AND CRANKSHAFT TO WHICH THE TORSIONAL DAMPER WITH INDEPENDENTLY ROTATING INERTIA MASSES IS APPLIED

(71) Applicant: HYUNDAI MOTOR COMPANY, Seoul (KR)

(72) Inventor: Sang-Chul Son, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 128 days.

(21) Appl. No.: 14/955,959

(22) Filed: Dec. 1, 2015

(65) Prior Publication Data

US 2017/0067534 A1 Mar. 9, 2017

(30) Foreign Application Priority Data

Sep. 3, 2015 (KR) ........................ 10-2015-0125118

(51) Int. Cl.
*F16F 15/30* (2006.01)
*F16C 3/06* (2006.01)

(52) U.S. Cl.
CPC ................ *F16F 15/30* (2013.01); *F16C 3/06* (2013.01)

(58) Field of Classification Search
CPC .. F16F 15/30; F16F 15/10; F16F 15/31; F16F 15/315; F16F 15/3156; F16F 15/322; F16F 15/283; F16F 15/26; F16F 15/131; F16F 15/13171; F16C 3/06
See application file for complete search history.

(56) References Cited

U.S. PATENT DOCUMENTS

| 4,262,553 | A | | 4/1981 | Bremer, Jr. | |
|---|---|---|---|---|---|
| 4,307,627 | A | * | 12/1981 | Sullivan | F16F 15/1442 464/17 |
| 5,425,287 | A | * | 6/1995 | Beattie | F16F 15/1442 464/180 |
| 5,720,205 | A | * | 2/1998 | Harrington | F16F 15/173 74/573.1 |
| 5,749,269 | A | | 5/1998 | Szymanski et al. | |
| 6,699,131 | B2 | * | 3/2004 | Jackel | F16F 15/13142 192/203 |
| 7,850,557 | B2 | * | 12/2010 | Moriya | F16H 55/36 464/90 |
| 8,283,825 | B2 | | 10/2012 | Maier | |
| 2016/0061286 | A1 | * | 3/2016 | Manzoor | F16F 15/30 74/574.4 |

FOREIGN PATENT DOCUMENTS

| JP | H06-159442 A | 6/1994 |
|---|---|---|
| JP | 2000-035086 A | 2/2000 |
| JP | 2015-017671 A | 1/2015 |
| KR | 10-0482445 B1 | 4/2005 |
| KR | 10-2010-0064088 A | 6/2010 |

* cited by examiner

*Primary Examiner* — Adam D Rogers
(74) *Attorney, Agent, or Firm* — McDermott Will & Emery LLP

(57) ABSTRACT

A torsional damper with independently rotating inertia masses, wherein an inner inertia ring is located at an inner diameter portion of an outer inertia ring in an internal chamber defined by coupling of a case, so that the inner and outer inertia rings form a dual concentric circle, through which an axial hole is formed to a cover, the inner inertia ring is moved relative to rotation of the case, and then the outer inertia ring is moved relative thereto.

7 Claims, 6 Drawing Sheets

CROSS-SECTION OF A-A

ENGINE STOP      ENGINE ROTATION

FIG.6

TORSIONAL DAMPER WITH INDEPENDENTLY ROTATING INERTIA MASSES AND CRANKSHAFT TO WHICH THE TORSIONAL DAMPER WITH INDEPENDENTLY ROTATING INERTIA MASSES IS APPLIED

CROSS-REFERENCE TO RELATED APPLICATION

This application claims the benefit of priority to Korean Patent Application No. 10-2015-0125118, filed on Sep. 3, 2015 with the Korean Intellectual Property Office, which is incorporated herein by reference in its entirety.

TECHNICAL FIELD

Exemplary embodiments of the present disclosure relate to a torsional damper; and, particularly, to a torsional damper having a high ratio of inertia mass to weight even within a limited space in front of an engine, and a crankshaft to which the same is applied.

BACKGROUND

In general, torsional dampers relieve a torsional load applied to a crankshaft due to a combustion pressure generated during explosions in each cylinder of an engine. Therefore, the torsional dampers prevent the torsional displacement of the crankshaft from being increased, and thus decrease a risk that the crankshaft is damaged due to fatigue.

As an example of these torsional dampers, a viscous damper applied to a crankshaft of a commercial engine requires high damping performance due to characteristics of the engine. To this end, it is necessary to improve the torsional damping performance of the viscous damper by increasing the inertia mass and size thereof.

For example, the viscous damper includes a case and a cover functioning as a housing accommodating all components, an inertia ring functioning as a medium for converting vibrational energy into thermal energy, silicon oil with which an inner gap is filled by 80% of the whole volume to have an empty volume, the silicon oil serving to absorb thermal energy and emit it to the outside, and a bearing for smoothly maintaining the motion of inertia mass relative to the case. Accordingly, the damping performance of the viscous damper may be easily improved by increasing the inertia mass and inner and outer diameters of the inertia ring.

However, in order to increase the inertia mass and inner and outer diameters of the viscous damper, it is necessary to first resolve the interference with surrounding components in front of the engine due to the layout of an engine compartment.

Thus, the thermal emissivity of the viscous damper is increased by increasing a heat radiation area, thereby allowing the damping performance of the viscous damper to be improved. However, this method has a little effect on an improvement in damping performance compared to the method of increasing the inertia mass and inner and outer diameters of the viscous damper, and the viscous damper is costly to manufacture due to a change in structure or shape of the cover or case.

SUMMARY OF THE DISCLOSURE

An embodiment of the present disclosure is directed to a torsional damper with independently rotating inertia masses, which has a high ratio of inertia mass to weight by dually constituting independently rotating inertia rings even under a limited space in front of an engine, and particularly has improved damping performance by an improvement of the ratio of inertia mass to weight even under a reduction in weight, and a crankshaft to which the same is applied.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with an embodiment of the present disclosure, the above and other objects can be accomplished by the provision of a torsional damper with independently rotating inertia masses, including an inner inertia ring made of a cast iron material, an outer inertia ring made of a material having a high specific gravity, and an additional outer bearing configured to obtain maximum attenuation of vibration between the two separated inertia rings. Vibrational energy, which is absorbed by relative motion between a case directly connected to a crankshaft and the inertia rings floating therein by silicon oil, is converted into thermal energy, and the converted thermal energy is emitted. Consequently, the torsional displacement of the crankshaft is attenuated by the relative motion of the two inertia rings.

In the torsional damper, an inner inertia ring is located at an inner diameter portion of an outer inertia ring, so that the inner and outer inertia rings form a dual concentric circle, in an internal chamber defined by coupling of a case, through which an axial hole is formed, to a cover, the inner inertia ring is moved relative to rotation of the case, and then the outer inertia ring is moved relative thereto.

The inner and outer inertia rings may be made of materials having different specific gravities. The specific gravity of the outer inertia ring may be greater than that of the inner inertia ring.

The inner inertia ring may be supported by an inner bearing to be coupled to an inner portion of the case, and the outer inertia ring may be supported by an outer bearing to be coupled to the inner inertia ring. The inner and outer inertia rings may be supported in axial directions thereof by thrust bearings, respectively, or may be supported in both axial and circumferential directions thereof by the thrust bearings, respectively. The thrust bearings may have an "L" shape or a separated shape.

In addition, oil may be injected into the internal chamber, and a gap defined by the inner and outer inertia rings and the internal chamber may be filled with the oil. The oil may be silicon oil.

In accordance with another embodiment of the present disclosure, a crankshaft includes a torsional damper including a case and a cover coupled to each other to define an internal chamber, inner and outer inertia rings forming a dual concentric circle in the internal chamber and configured such that, when the case rotates, the respective inner and outer inertia rings are moved relative to the rotation of the case, and silicon oil with which a gap defined by the inner and outer inertia rings and the internal chamber is filled, and a crank nose fitted and bolted to an axial hole formed through the case and the cover.

DETAILED DESCRIPTION

Exemplary embodiments of the present disclosure will be described below in more detail with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Throughout the disclosure, like reference numerals refer to like parts throughout the various figures and embodiments of the present disclosure.

Figure 1:
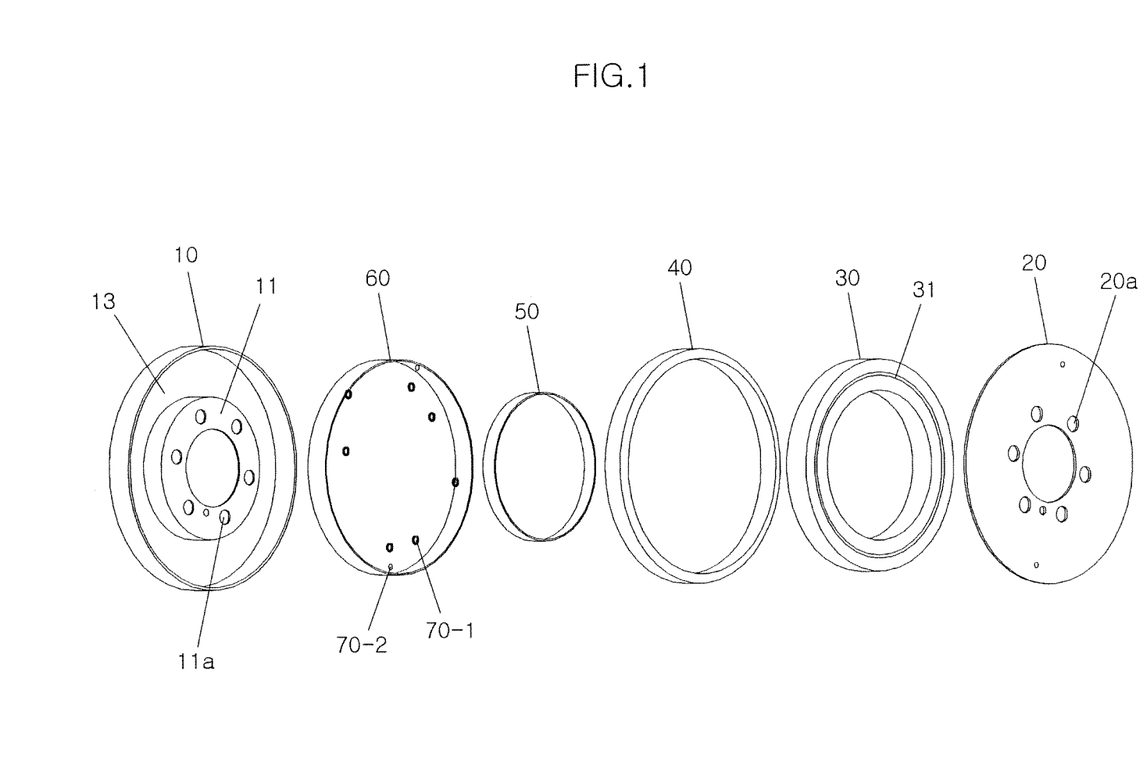
FIG. 1 is an exploded view illustrating a configuration of a torsional damper with independently rotating inertia masses classified into inner and outer inertia rings, according to an embodiment of the present disclosure.

FIG. 1 is an exploded view illustrating a configuration of a torsional damper with independently rotating inertia masses classified into inner and outer inertia rings, according to an embodiment of the present disclosure.

As illustrated in the drawing, the torsional damper, which is designated by reference numeral 1, may include a case 10, a cover 20, an inner inertia ring 30, an outer inertia ring 40, an inner bearing 50, an outer bearing 60, inner thrust bearings 70-1, and outer thrust bearings 70-2.

Specifically, the case 10 and the cover 20 are coupled to each other to define an internal chamber 13 which is an empty space. The internal chamber 13 accommodates all of the inner and outer inertia rings 30 and 40, the inner and outer bearings 50 and 60, the inner and outer thrust bearings 70-1 and 70-2, and oil 80. In addition, the respective case 10 and cover 20 have a plurality of case fastening holes 11a and a plurality of cover fastening holes 20a, which are formed at intervals in a circular form. The positions and number of the cover fastening holes 20a are equal to those of the case fastening holes 11a. In particular, the case 10 is further formed with a direct connection flange 11 through which the case fastening holes 11a are formed. The direct connection flange 11 is connected to a rotary shaft so as to relieve and dampen the torsional load of the rotary shaft. In the embodiment, the case 10 and the cover 20 may be fixed and integrated by welding.

Specifically, the inner inertia ring 30 may be an inertia mass having inner and outer diameters and a width. The inner inertia ring 30 functions as a medium for converting vibrational energy into thermal energy by motion relative to the integrated case 10 and cover 20 during the explosion stroke of an engine in order to accomplish a reduction in torsional displacement which is a function of the torsional damper. In addition, the inner inertia ring 30 has an annular groove 31 which is concentrically formed on one surface thereof facing the cover 20. If necessary, the outer diameter portion of the inner inertia ring 30 may be processed such that the inner inertia ring 30 is bolted to the outer inertia ring 40. Particularly, the inner inertia ring 30 may be made of a material having a relatively smaller specific gravity than the outer inertia ring 40. For example, the inner inertia ring 30 may be made of cast iron. Meanwhile, the outer inertia ring 40 is an inertia ring having inner and outer diameters and a width, and is located outside the inner inertia ring 30. Particularly, the outer inertia ring 40 is made of a material having a relatively greater specific gravity than the inner inertia ring 30. For example, the outer inertia ring 40 may be made of copper. As such, since the outer inertia ring 40 having a greater specific gravity than the inner inertia ring 30 is disposed at the outer diameter portion of the inner inertia ring 30, the inertia mass can be maximally secured, and reductions in weight and cost and optimal shapes can be accomplished even under the limited condition of layouts in which it is difficult to increase the inner and outer diameters and the width. For example, if both of the inner and outer inertia rings 30 and 40 are made of a material having a high specific gravity, the inner inertia ring 30 has an unnecessarily increased weight, and the increased effect of the inertia mass is removed.

Specifically, the inner bearing 50 has a gap formed between the case 10 and the inner inertia ring 30, thereby allowing the motion of the inner inertia ring 30 relative to the integrated case 10 and cover 20 to be smoothly maintained. The outer bearing 60 has a gap formed between the case 10 and the outer inertia ring 40, thereby allowing the motion of the outer inertia ring 40 relative to the integrated case 10 and cover 20 to be smoothly maintained.

Specifically, the inner thrust bearings 70-1 are mounted in the axial direction of the inner inertia ring 30, the outer thrust bearings 70-2 are mounted in the axial direction of the outer inertia ring 40, so that the motion of the inner and outer inertia rings 30 and 40 relative to the case 10 is smoothly maintained. Particularly, the inner and outer thrust bearings 70-1 and 70-2 may have various shapes, such as an "L" shape or a separated shape, so as to be simultaneously in contact in circumferential and thrust directions.

Figure 2:
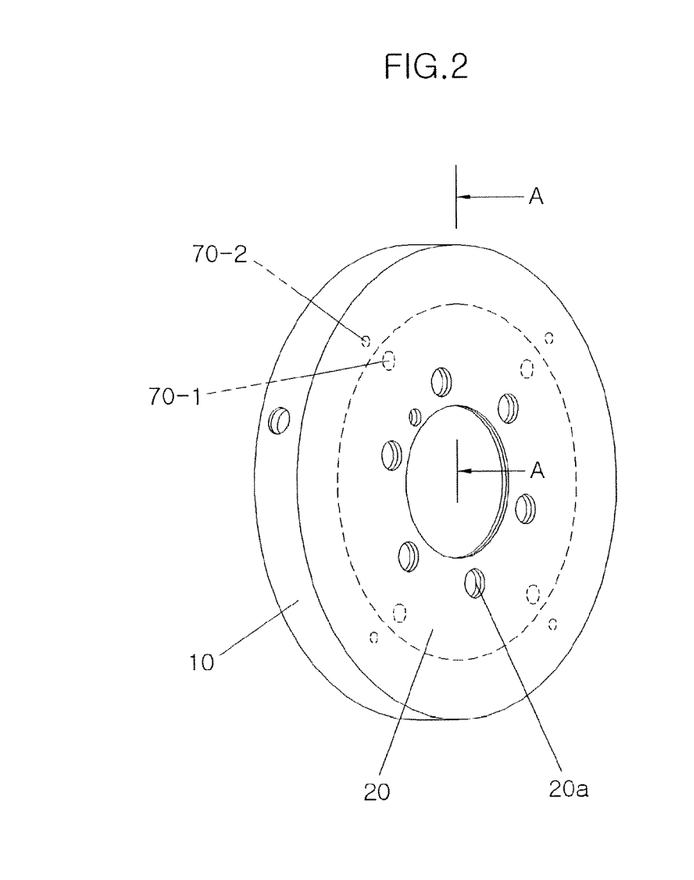
FIGS. 2 and 2a are cross-sectional views illustrating an assembly of the torsional damper having the inner and outer inertia rings according to an embodiment of the present disclosure.
Figure 2A:
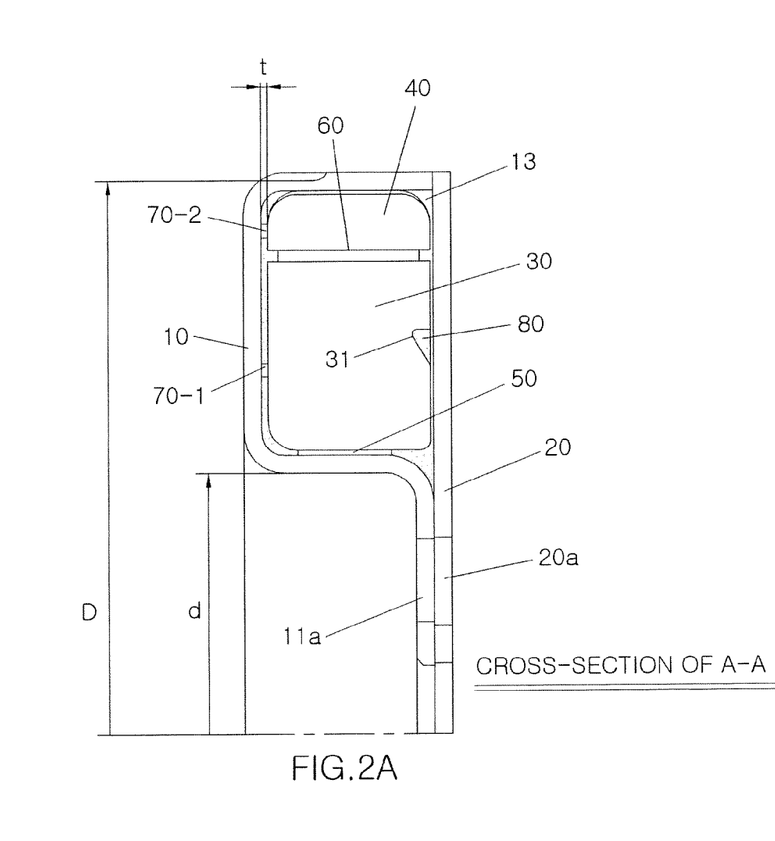

Meanwhile, FIGS. 2 and 2a illustrate the assembly and cross-section of the torsional damper 1.

The torsional damper 1 has a circular external shape having a certain diameter and width thickness. One surface of the case 10 is covered by the cover 20, and the internal chamber 13 blocked from the outside is filled with the oil 80. In addition, the torsional damper 1 has axial holes such that counterpart components may be connected to the center of the case 10 and cover 20, which may be fixed and integrated by welding, through the axial holes. The counterpart components fitted to the axial holes using the case fastening holes 11a and cover fastening holes 20a, which are concentrically formed with the axial holes, are fastened by bolts. In addition, the oil 80 may be silicon oil. Particularly, since the size of the torsional damper 1, and the inner and outer diameters d and D of the case 10 are determined by crankshafts having a different size according to specifications of engines, the above sizes is not limited to a specific value.

The torsional damper 1 has an internal structure in which the inner inertia ring 30 located inward and the outer inertia ring 40 located outward from double inertia masses in the internal chamber 13 between the case 10 and the cover 20. Specifically, the inner bearing 50 fitted to the outer diameter portion of the direct connection flange 11 is provided at the inner diameter portion of the inner inertia ring 30, and the inner thrust bearings 70-1 coming into contact with the inner wall of the case 10 are provided in the axial direction, thereby allowing the motion relative to the integrated case 10 and cover 20 to be smoothly performed. The outer bearing 60 fitted to the outer diameter portion of the inner bearing 50 is provided at the inner diameter portion of the outer inertia ring 40, and the outer thrust bearings 70-2 coming into contact with the inner wall of the case 10 are provided in the axial direction, thereby allowing the motion relative to the integrated case 10 and cover 20 to be smoothly performed. Particularly, the sizes of the inner and outer inertia rings 30 and 40 allow a gap t to be formed with respect to the width thickness of the internal chamber 13, with the consequence that a space filled with the injected oil 80 is defined.

In the embodiment, the oil 80 is injected into the internal chamber 13 between the case 10 and the cover 20, and absorbs thermal energy generated by the motion of the inner and outer inertia rings 30 and 40 relative to the integrated case 10 and cover 20. The thermal energy absorbed by the oil 80 is emitted to the case 10 and the cover 20.

Therefore, the torsional damper 1 is a viscous damper applied to a commercial engine.

Figure 3:
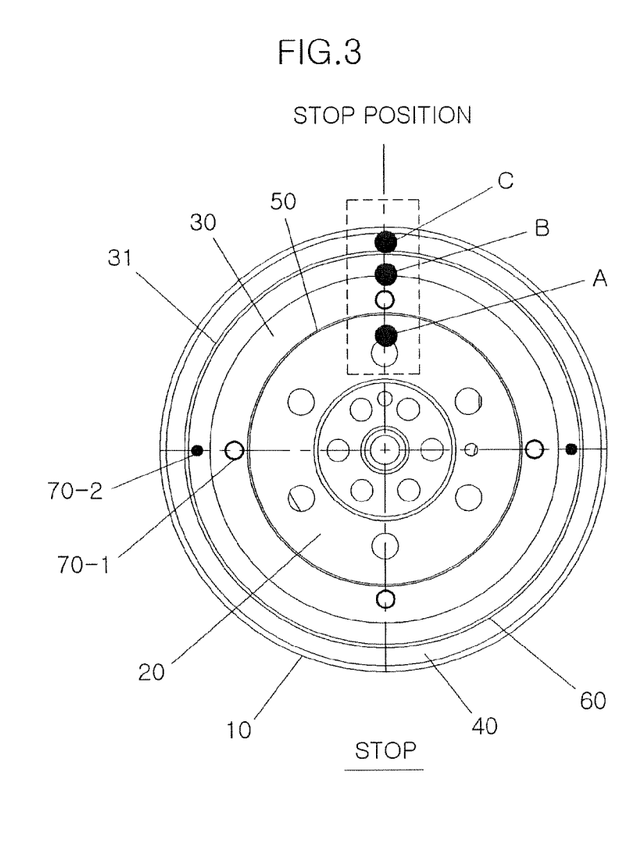
FIGS. 3 and 3a are views illustrating relative rotation of the inner and outer inertia rings according to an embodiment of the present disclosure.
Figure 3A:
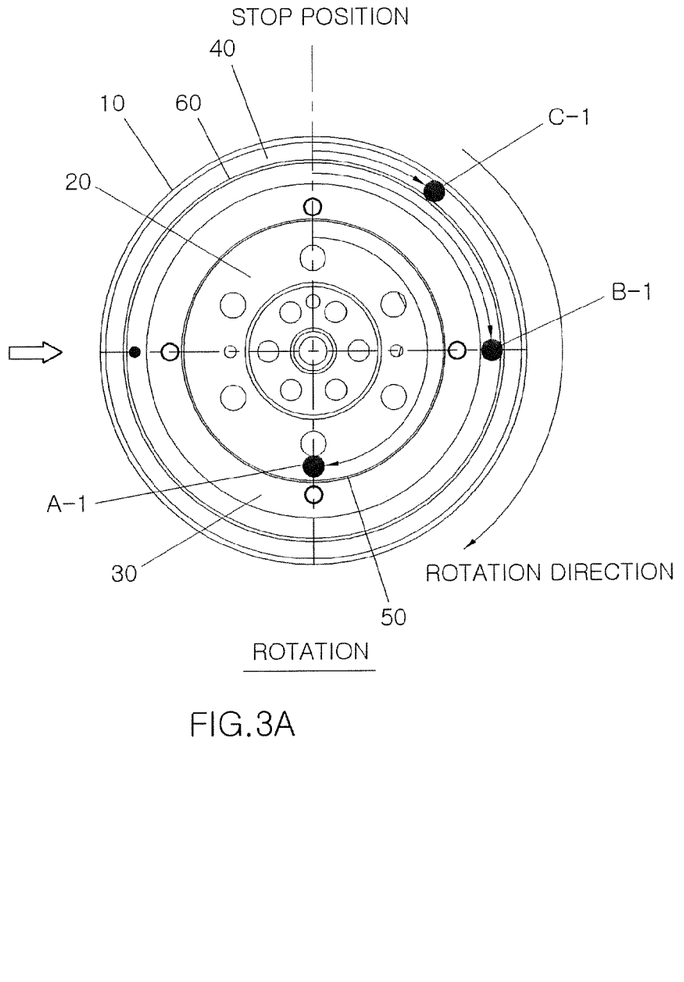

Meanwhile, FIGS. 3 and 3a illustrate the operation of the torsional damper 1.

As illustrated in the drawings, when the torsional damper 1 is not operated (is stopped), a stop position A of the case 10 integrated with the cover 20, a stop position B of the inner inertia ring 30, and a stop position C of the outer inertia ring 40 are aligned in a row.

However, when the torsional damper 1 is operated (rotated) by rotational force transferred from the outside, the case 10 integrated with the cover 20 rotates, and thus the inner inertia ring 30 floating by the oil 80 is primarily rotated by friction force and inertia generated by the viscosity of the silicon oil. Next, after the rotation of the inner inertia ring 30, the outer inertia ring 40 is rotated by the oil 80 between the inner and outer inertia rings 30 and 40. In this case, the stop position A of the case 10 integrated with the cover 20 is changed to a rotation position A-1, the stop position B of the inner inertia ring 30 is changed to a rotation position B-1, and the stop position C of the inner inertia ring 30 is changed to a rotation position C-1. As a result, in the 360-degree rotation of the torsional damper 1, when the rotation position A-1 is located at 180 degrees, the rotation position B-1 is located at 90 degrees, and the rotation position C-1 is located at 45 degrees. Thus, the inner inertia ring 30 moves relative to the case 10, and the outer inertia ring 40 moves relative to the case 10 and the inner inertia ring 30. In this case, the oil 80 absorbs heat generated by the case 10, the inner inertia ring 30, and the outer inertia ring 40 which are moved relative to one another, and then emits the heat to the outside.

Therefore, when a rotation member is connected to the torsional damper 1 such that rotational force is transferred from the outside, the relative motion of the torsional damper 1 relieves the torsion of the rotation member so as not to increase the torsional displacement.

Figure 4:
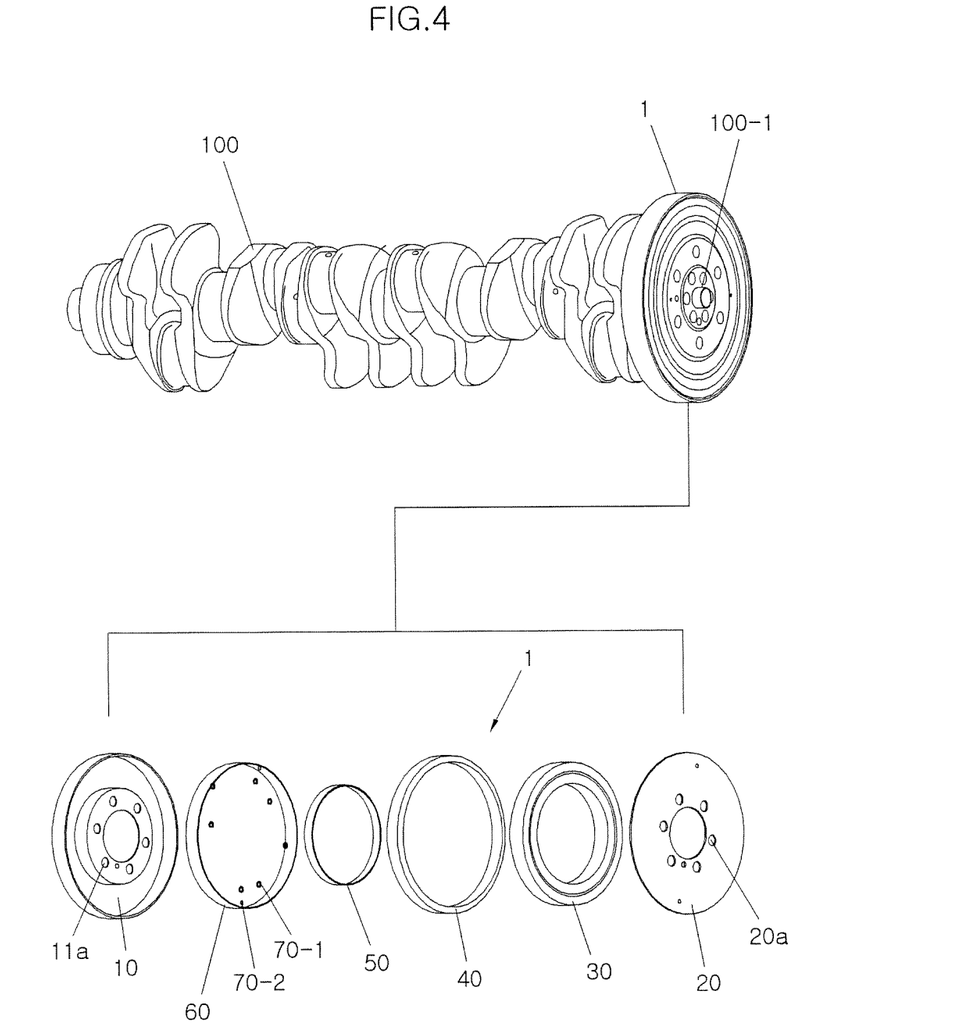
FIG. 4 is a view illustrating a configuration of a crankshaft to which the torsional damper having the independently rotating inner and outer inertia rings is applied, according to the embodiment of the present disclosure.

Meanwhile, FIG. 4 illustrates a crankshaft 100 to which the torsional damper 1 is applied.

As illustrated in the drawing, the crankshaft 100 has a crank nose 100-1 to which the torsional damper 1 is mounted.

The torsional damper 1 may include a case 10, a cover 20, inner and outer inertia rings 30 and 40, inner and outer bearings 50 and 60, inner and outer thrust bearings 70-1 and 70-2, and silicon oil (not shown) injected into the internal chamber of the integrated case 10 and cover 20. Therefore, the torsional damper 1 is similar to the torsional damper 1 described with reference to FIGS. 1 to 3a.

The torsional damper 1 is fitted to the crank nose 100-1 through the axial holes of the integrated case 10 and cover 20. The torsional damper 1 is bolted to the crank nose 100-1 through the case fastening holes 11a and the cover fastening holes 20a, and is fixed to the crank nose 100-1 to be integrated therewith.

In the embodiment, the crankshaft 100 is a crankshaft applied to the commercial engine.

Figure 5:
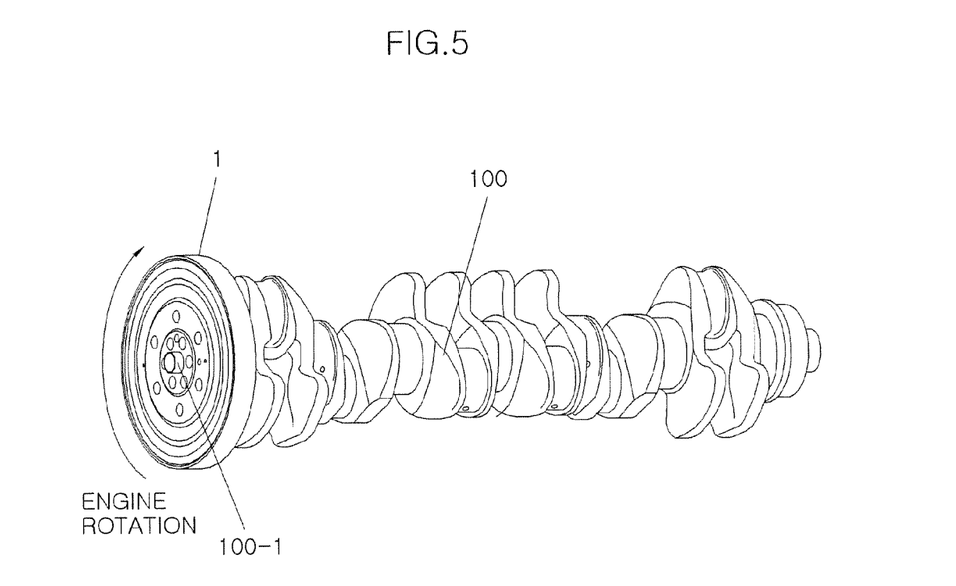
FIGS. 5, 5a and 5b are views illustrating a state of operation of the torsional damper having the inner and outer inertia rings which are independently rotated by rotation of the crankshaft according to the embodiment of the present disclosure.
Figure 5A:
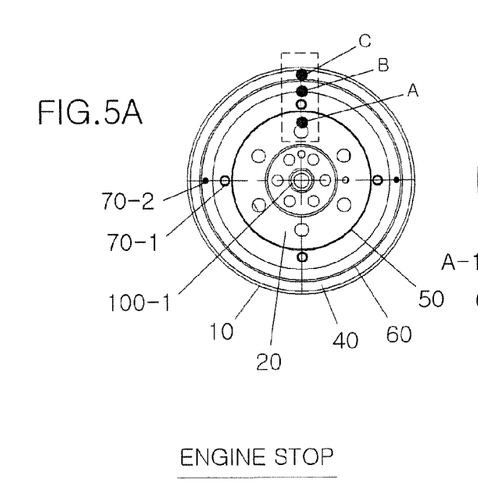
Figure 5B:
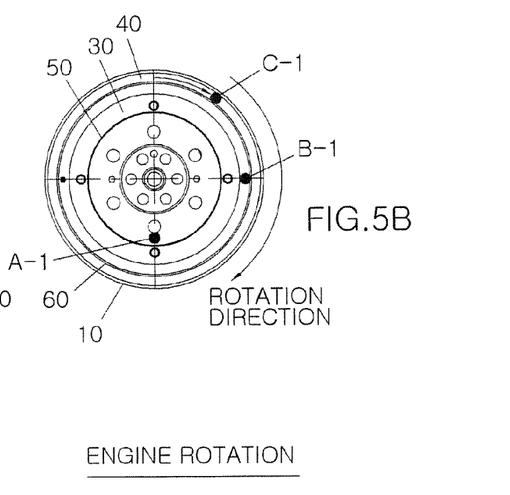

Meanwhile, FIGS. 5, 5a and 5b illustrate the rotation of the crankshaft 100 and the operation of the torsional damper 1.

As illustrated in the drawings, the case 10 fixed to the crank nose 100 is rotated by the rotation of the crankshaft 100. When the case 10 rotates, the inner inertia ring 30 floating by the silicon oil, with which the internal chamber of the integrated case 10 and cover 20 is filled, is first rotated, and then the outer inertia ring 40 is rotated.

By the rotation of the case 10 and the inner and outer inertia rings 30 and 40, when the rotation position A-1 of the case 10 is located at 180 degrees in the 360-degree rotation of the crankshaft 100, the rotation position B-1 of the inner inertia ring 30 is located at 90 degrees, and the rotation position C-1 of the outer inertia ring 40 is located at 45 degrees. Consequently, the case 10, the inner inertia ring 30, and the outer inertia ring 40 are sequentially rotated at a relative speed, and thus vibrational energy generated during the explosion stroke of the engine is absorbed, and the energy is converted (vibrational energy→thermal energy).

Furthermore, a difference in relative speed between the case 10, the inner inertia ring 30, and the outer inertia ring 40 is lower than a difference in relative speed when the case 10 and the inner inertia ring 30 are merely moved relative to each other. Thus, heat transferred to the silicon oil is also reduced. As a result, the reduction of heat in the silicon oil prevents the silicon oil from deteriorating so that the torsional damper 1 has improved durability, and this is advantageous to increasing the performance margin for optimal weight/shape.

Figure 6:
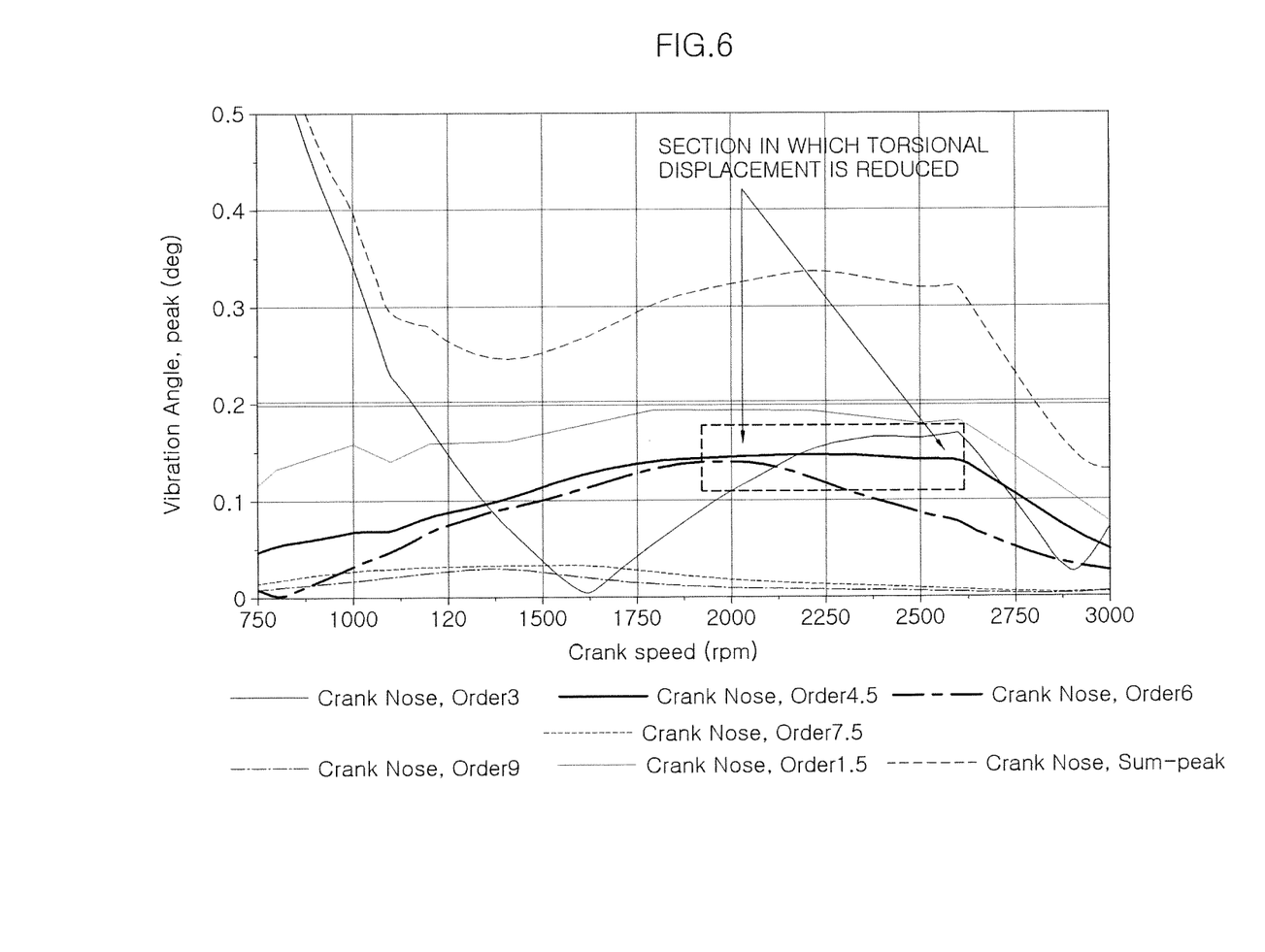
FIG. 6 is a graph illustrating torsional performance of the crankshaft to which the torsional damper having the inner and outer inertia rings is applied, according to the embodiment of the present disclosure.

FIG. 6 illustrates an experimental example of torsional performance of the crankshaft 100 to which the torsional damper 1 is applied, the difference in relative speed between the case 10, the inner inertia ring 30, and the outer inertia ring 40 being low in the torsional damper 1.

As illustrated in the drawing, the vertical axis refers to the vibration angle of the crank nose 100-1, and the horizontal axis refers to the speed (RPM; Revolution per Minute) of the crank nose 100-1. In this case, it may be seen that the section in which the torsional displacement of the crankshaft 100 is reduced is extended to the section of speed of 1,800 RPM to 2,600 RPM of the crank nose 100-1. This result, in which the reduced section of the torsional displacement is extended, is exemplified in the experimental example in which double inertia masses consisting of the inner and outer inertia rings 30 and 40 generates a weight increase of about 5 to 6% and an inertia mass increase of about 7 to 7.5%, compared to a single inertia mass consisting of one inertia ring 30.

Therefore, the reduced section of the torsional displacement may be further improved by an appropriate change according to the weight increase and the inertia mass increase.

As described above, the crankshaft of the present disclosure is provided with the torsional damper 1 having independently rotating inertia rings. The torsional damper 1 includes the inner inertia ring 30 configured such that the inner inertia ring 30 is first moved relative to the rotation of the case 10 in the internal chamber 13 defined by coupling the case 10 through which the axial holes are formed and the cover 20, and the outer inertia ring 40 which is concentrically formed with the inner inertia ring 30, the outer inertia ring 40 being secondarily moved relative thereto. As a result, even when the space in front of the engine is limited, the ratio of inertia mass to weight can be significantly increased, and particularly damping performance can be improved by the improvement of the ratio of inertia mass to weight even under the reduction in weight.

In accordance with the exemplary embodiments of the present disclosure, since the different materials and the double inertia rings are applied to the torsional damper, the ratio of inertia mass to weight can be improved over about 30% under the same layout design condition, compared to a single inertia ring.

In addition, even when the layout of the engine room is limited, the viscous damper can be designed in a manner of increasing the weight of the inertia ring so as to have high damping performance, compared to a pin manner of causing low damping performance and high costs.

In addition, since the dimensions of the components including two inertia masses of different materials are adjustable in order to maintain the same damping performance and satisfy the condition of layout or weight during the design of the viscous damper, the improvement of performance and the reduction of weight and cost can be realized even under the structure of any engine compartment.

In addition, since the viscous damper which realizes high damping performance by two independently rotating inertia masses of different materials is applied to the crankshaft, the crankshaft can be prevented from being damaged due to fatigue even under the torsional condition of the commercial engine, thereby having improved safety.

While the present disclosure has been described with respect to the specific embodiments, it will be apparent to those skilled in the art that various changes and modifications may be made without departing from the spirit and scope of the disclosure as defined in the following claims.

What is claimed is:

1. A torsional damper, comprising:
   an inner inertia ring located at an inner diameter portion of an outer inertia ring in an internal chamber defined by coupling of a case to a cover, so that the inner and outer inertia rings form a dual concentric circle through which an axial hole is formed, wherein the inner inertia ring is moved relative to rotation of the case, and then the outer inertia ring is moved relative thereto,
   wherein the inner inertia ring is supported by an inner bearing to be coupled to an inner portion of the case, and the outer inertia ring is supported by an outer bearing to be coupled to the inner inertia ring, and
   wherein the inner and outer inertia rings are supported in axial directions thereof by thrust bearings.

2. The torsional damper of claim 1, wherein the inner and outer inertia rings are made of materials having different specific gravities.

3. The torsional damper of claim 2, wherein the specific gravity of the outer inertia ring is greater than that of the specific gravity of the inner inertia ring.

4. The torsional damper of claim 1, wherein oil is injected into the internal chamber, and a gap defined by the inner and outer inertia rings and the internal chamber is filled with the oil.

5. The torsional damper of claim 4, wherein the oil is silicon oil.

6. A crankshaft comprising:
   a torsional damper comprising a case and a cover coupled to each other to define an internal chamber, inner inertia ring and outer inertia ring forming a dual concentric circle in the internal chamber such that, when the case rotates, the respective inner inertia ring and outer inertia ring are moved relative to the rotation of the case, and silicon oil with which a gap defined by the inner inertia ring and outer inertia ring and the internal chamber is filled; and
   a crank nose connected to the torsional damper so as to transfer a rotational force of the crankshaft generated when an engine is operated,
   wherein the inner inertia ring is supported by an inner bearing to be coupled to an inner portion of the case, and the outer inertia ring is supported by an outer bearing to be coupled to the inner inertia ring, and
   wherein the inner and outer inertia rings are supported in axial directions thereof by thrust bearings.

7. The crankshaft of claim 6, wherein the crank nose is integrated with the case and the cover of the torsional damper.

* * * * *